United States Patent
Eddy et al.

(10) Patent No.: US 11,173,871 B2
(45) Date of Patent: Nov. 16, 2021

(54) RETROFIT SEAT BELT SYSTEM FOR MOTOR COACH, WITH IMPACT DAMPERS AND CABLE SUPPORT

(71) Applicant: The University of Massachusetts, Boston, MA (US)

(72) Inventors: Douglas Eddy, Amherst, MA (US); Sundar Krishnamurty, Amherst, MA (US); Shreyas Patil, Amherst, MA (US); Anne Schewe, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 78 days.

(21) Appl. No.: 16/789,842

(22) Filed: Feb. 13, 2020

(65) Prior Publication Data
US 2020/0254963 A1      Aug. 13, 2020

Related U.S. Application Data

(60) Provisional application No. 62/805,100, filed on Feb. 13, 2019.

(51) Int. Cl.
*B60R 22/34*   (2006.01)
*B60R 22/22*   (2006.01)

(52) U.S. Cl.
CPC .......... *B60R 22/3413* (2013.01); *B60R 22/22* (2013.01); *B60R 22/34* (2013.01)

(58) Field of Classification Search
CPC . B60R 2022/1818; B60R 22/26; B60R 22/18; B60R 22/00; B60R 22/023; B60R 22/34; B60R 22/22; B60R 22/3413

(Continued)

(56) References Cited

U.S. PATENT DOCUMENTS 5,020,856 A * 6/1991 George ............... B60R 22/18
                                                  280/801.1
5,265,909 A * 11/1993 Verbeski ............ B60R 22/22
                                                  280/808

(Continued)

FOREIGN PATENT DOCUMENTS

DE    4324420 A1 * 1/1995    ............ B60R 22/18
DE    4438234 A1 * 5/1995    ............ B60R 22/18

(Continued)

OTHER PUBLICATIONS

English translation dated Jun. 24, 2021 from European Patent Office of DE19629128A1 (Year: 1998).*

(Continued)

*Primary Examiner* — Paul N Dickson
*Assistant Examiner* — Caitlin Anne Miller
(74) *Attorney, Agent, or Firm* — Cantor Colburn LLP

(57) ABSTRACT

Disclosed is a retrofitting seatbelt system for a motor coach, the system including: a base plate, the base plate configured to connect to a floor rail of the motor coach; a longitudinal post configured to support a belt, the longitudinal post defines a longitudinal post inner end connected to the base plate, wherein the longitudinal post extends away from the base plate in a longitudinal direction to a longitudinal post outer end, wherein the longitudinal post defines a forward-side that faces a forward direction, and an aft-side that faces an aft direction, wherein the forward direction and the aft direction are disposed along a forward-aft axis; and a first motion damper connected to the longitudinal post near the longitudinal post outer end, the first motion damper extends in the aft direction, beyond the aft-side of the longitudinal post.

19 Claims, 7 Drawing Sheets

(58) Field of Classification Search
USPC .......................................................... 280/805
See application file for complete search history.

(56) References Cited

U.S. PATENT DOCUMENTS

| | | | | |
|---|---|---|---|---|
| 5,494,316 | A | * | 2/1996 | Maesing ................. B60R 22/18 |
| | | | | 280/808 |
| 6,485,098 | B1 | * | 11/2002 | Vits ........................ B60N 2/242 |
| | | | | 297/216.13 |
| 2017/0096121 | A1 | * | 4/2017 | Krishnamurty ....... B60R 22/023 |

FOREIGN PATENT DOCUMENTS

| | | | | | |
|---|---|---|---|---|---|
| DE | 19629128 | A1 | * | 1/1998 | ................ B60Q 3/44 |
| GB | 2287645 | A | * | 9/1995 | ............. B60N 2/688 |
| WO | 2015179784 | A1 | | 11/2015 | |

OTHER PUBLICATIONS

Eddy, Douglas, et al., "Design and Evaluation of an Affordable Seatbelt Retrofit for Motor Coach Occupant Safety", SAE International, Published Jan. 10, 2017 (8 pp.)

\* cited by examiner

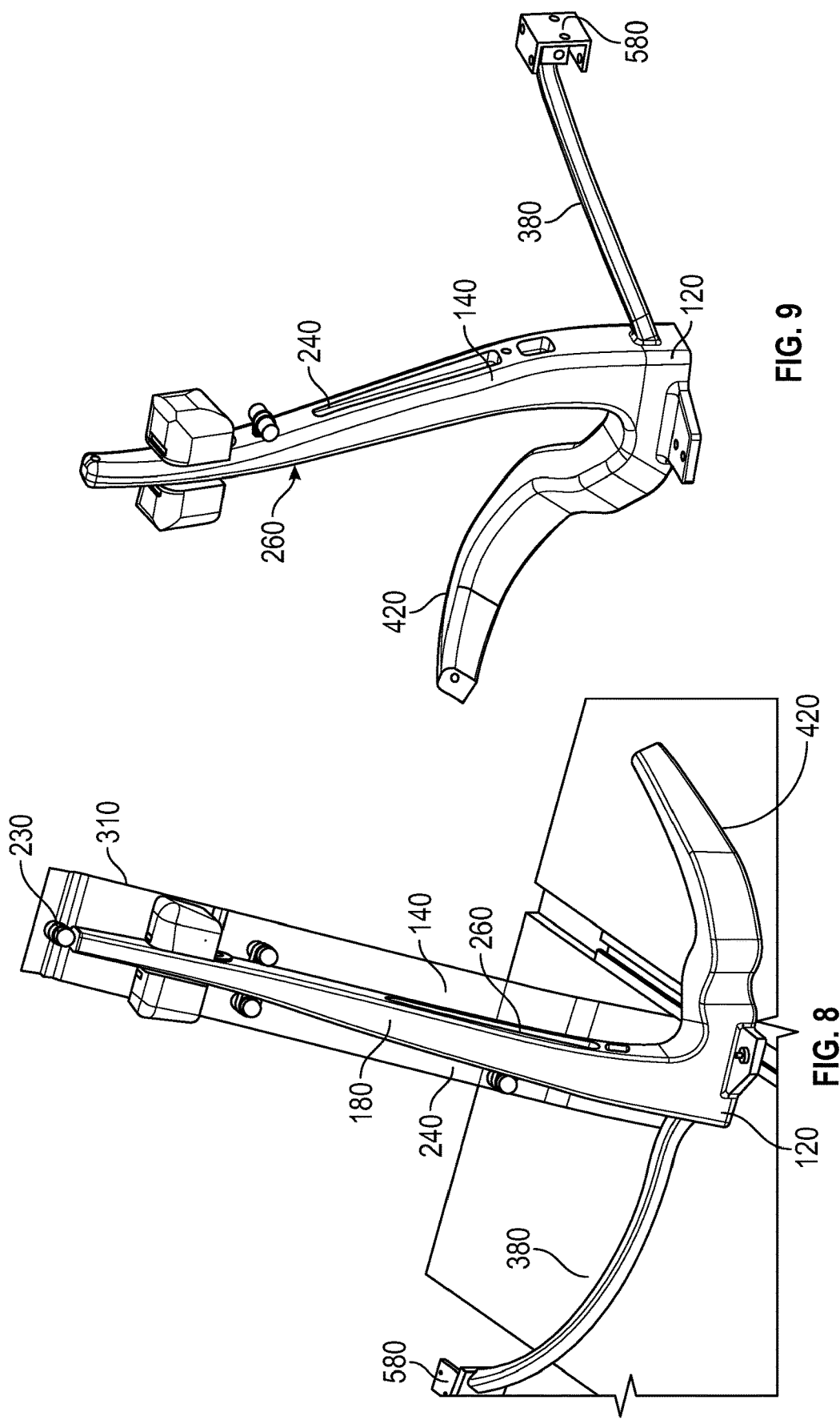

RETROFIT SEAT BELT SYSTEM FOR MOTOR COACH, WITH IMPACT DAMPERS AND CABLE SUPPORT

CROSS REFERENCE TO RELATED APPLICATIONS

This application claims priority to U.S. Provisional Patent Application No. 62/805,100, filed on Feb. 13, 2019, for a RETROFIT SEAT BELT SYSTEM, the entire contents of which are incorporated herein by reference.

STATEMENT OF FEDERAL SUPPORT

This invention was made with government support under contract number DTRT13-G-UTC31 awarded by the US Department of Transportation. The government has certain rights in the invention.

BACKGROUND

These teachings relate generally to seat belt systems and, more particularly, to a retrofit seat belt system, for a motor coach, with impact dampers and a cable support.

The world population is on the rise, and owing to limited geographical area, the strain on means of travel is increasing. As roadways have become the most preferred means of travel, the ever increasing number of vehicles on existing roads is increasing the risk of accidents. Thus the motor coach industry in the world today is faced with the widely acknowledged challenge to protect and ensure the safety of their passengers. A typical motor coach carries dozens of people, making the consequences of a crash even more severe than crashes involving passenger cars.

It has been shown that the use of either a two-point lap belt or a three-point seatbelt greatly increases the likelihood that passengers will remain in their seat during a collision. The use of seatbelts is essential in order to provide passenger safety for motor coaches. Considering the fact that still a significant number of coaches are not equipped with seatbelts, there exists a need for improved low-cost retrofit seatbelt solutions for motor coaches.

BRIEF SUMMARY

Disclosed is a retrofitting seatbelt system for a motor coach, the system including: a base plate, the base plate configured to connect to a floor rail of the motor coach; a longitudinal post configured to support a belt, the longitudinal post defines a longitudinal post inner end connected to the base plate, wherein the longitudinal post extends away from the base plate in a longitudinal direction to a longitudinal post outer end, wherein the longitudinal post defines a forward-side that faces a forward direction, and an aft-side that faces an aft direction, wherein the forward direction and the aft direction are disposed along a forward-aft axis; and a first motion damper connected to the longitudinal post near the longitudinal post outer end, the first motion damper extends in the aft direction, beyond the aft-side of the longitudinal post.

In addition to one or more of the above aspects or as an alternate, the longitudinal post defines a window-side that extends in a window-facing direction, and an aisle-side that extends in an aisle-facing direction, wherein the window-facing direction and aisle facing-direction are defined on a transverse axis that is normal to the forward-aft axis, and the first motion damper is formed by a first pair of motion dampers, one of which is disposed on the window-side of the of the longitudinal post and another of which is disposed on the aisle-side of the longitudinal post.

In addition to one or more of the above aspects or as an alternate, a first pair of brackets are respectively connected to the window-side and the aisle-side of the longitudinal post, and the first pair of brackets connect respective ones of the first pair of motion dampers to the longitudinal post.

In addition to one or more of the above aspects or as an alternate, a padding cover is disposed over the longitudinal post, from the base plate to the longitudinal post outer end, to conceal the first motion damper.

In addition to one or more of the above aspects or as an alternate, the first motion damper is pneumatic.

In addition to one or more of the above aspects or as an alternate, a longitudinal post outer belt anchor is connected to the longitudinal post, near the longitudinal post outer end, a belt retractor is connected to the longitudinal post, longitudinally adjacent to the longitudinal post outer end, and the first motion damper is disposed longitudinally adjacent to the longitudinal post outer belt anchor and/or the belt retractor.

In addition to one or more of the above aspects or as an alternate, a second motion damper is connected to the longitudinal post, longitudinally adjacent to the belt retractor, wherein the second motion damper extends in the aft direction, beyond the aft-side of the longitudinal post.

In addition to one or more of the above aspects or as an alternate, a longitudinal post inner belt anchor is connected to the longitudinal post in a longitudinal bottom portion of the longitudinal post, longitudinally offset from the base plate, and a third motion damper is connected to the longitudinal post, longitudinally adjacent to the longitudinal post inner belt anchor, the third motion damper extends in the aft direction, beyond the aft-side of the longitudinal post.

In addition to one or more of the above aspects or as an alternate, the longitudinal post defines a window-side that extends in a window-facing direction, and an aisle-side that extends in an aisle-facing direction, wherein the window-facing direction and aisle facing-direction are defined on a transverse axis that is normal to the forward-aft axis, a window-side post is configured to support a window-side buckle, wherein the window-side post defines a window-side post inner end connected to the window-side of the longitudinal post, wherein the window-side post extends away from the longitudinal post in the window-facing direction to a window-side post outer end, and an aisle-side post is configured to support an aisle-side buckle, wherein the aisle-side post defines an aisle-side post inner end connected to the aisle-side of the longitudinal post, and wherein the aisle-side post extends away from the longitudinal post in the aisle-facing direction to an aisle-side post outer end.

In addition to one or more of the above aspects or as an alternate, the aisle-side post outer end defines an aisle-side post passage, and the system further includes: a rod that is disposed within the aisle-side post passage and configured to slide within the aisle-side post passage, wherein the rod includes a rod forward end and the rod extends from the rod forward end to a rod aft end; an aisle-side post belt anchor, wherein the aisle-side post belt anchor is connected to the rod forward end; and a support cable, wherein the support cable includes a support cable inner end connected to the base plate, the support cable extends from the support cable inner end to a support cable outer end, wherein the support cable outer end is connected to the rod aft end, wherein, in operation, the aisle-side post belt anchor and the support cable are configured to limit forward and aft sliding of the rod within the aisle-side post passage.

In addition to one or more of the above aspects or as an alternate, a bushing is disposed within the aisle-side post passage and the rod is disposed within the bushing.

In addition to one or more of the above aspects or as an alternate, the system includes a truss beam, wherein the truss beam is in an angled orientation relative to the aisle-side post, and wherein the truss beam defines a truss beam inner end connected to the longitudinal post, longitudinally between the base plate and the aisle-side post inner end, wherein the truss beam extends from the truss beam inner end to a truss beam outer end, the truss beam outer end connected to the aisle-side post outer end, transversely adjacent the aisle-side post passage.

In addition to one or more of the above aspects or as an alternate, the aisle-side post inner end and the window-side post inner end are longitudinally level with each other and spaced apart from the base plate so as to be longitudinally level with the aisle-side post passage.

In addition to one or more of the above aspects or as an alternate, the aisle-side post outer end includes: a window-side post belt anchor; and a sidewall bracket, wherein the sidewall bracket is configured to mount to a sidewall of the motor coach.

In addition to one or more of the above aspects or as an alternate, the aisle-side post passage and the sidewall bracket are longitudinally level with each other.

In addition to one or more of the above aspects or as an alternate, a longitudinal post inner belt anchor is connected to the longitudinal post in a longitudinal bottom portion of the longitudinal post, longitudinally offset from the base plate, and the aisle-side post passage is longitudinally adjacent to the longitudinal post inner belt anchor via the rod.

Further disclosed is a retrofitting seatbelt system for a motor coach, the system including: a base plate, wherein the base plate is configured to connect to a floor rail of the motor coach; a longitudinal post configured to support a belt, the longitudinal post defines a longitudinal post inner end connected to the base plate, wherein the longitudinal post extends away from the base plate in a longitudinal direction to a longitudinal post outer end, wherein the longitudinal post defines a forward-side that faces a forward direction, and an aft-side that faces an aft direction, wherein the forward direction and the aft direction are disposed along a forward-aft axis, and the longitudinal post defines a window-side that extends in a window-facing direction, and an aisle-side that extends in an aisle-facing direction, wherein the window-facing direction and aisle facing-direction are defined on a transverse axis that is normal to the forward-aft axis; a window-side post configured to support a window-side buckle, wherein the window-side post defines a window-side post inner end connected to the window-side of the longitudinal post, wherein the window-side post extends away from the longitudinal post in the window-facing direction to a window-side post outer end; and an aisle-side post configured to support an aisle-side buckle, wherein the aisle-side post defines an aisle-side post inner end connected to the aisle-side of the longitudinal post, and wherein the aisle-side post extends away from the longitudinal post in the aisle-facing direction to an aisle-side post outer end.

In addition to one or more of the above aspects or as an alternate, the aisle-side post outer end defines an aisle-side post passage, the system further includes: a rod that is disposed within the aisle-side post passage and configured to slide within the aisle-side post passage, wherein the rod includes a rod forward end and a rod aft end; an aisle-side post belt anchor, wherein the aisle-side post belt anchor is connected to the rod forward end; and a support cable, wherein the support cable includes a support cable inner end connected to the base plate, the support cable extends from the support cable inner end to a support cable outer end, wherein the support cable outer end is connected to the rod aft end, wherein, in operation, the aisle-side post belt anchor and the support cable are configured to limit forward and aft sliding of the rod within the aisle-side post passage.

In addition to one or more of the above aspects or as an alternate, the system includes a truss beam, wherein the truss beam is in an angled orientation relative to the aisle-side post, and wherein the truss beam defines a truss beam inner end connected to the longitudinal post, longitudinally between the base plate and the aisle-side post inner end, wherein the truss beam extends from the truss beam inner end to a truss beam outer end, the truss beam outer end connected to the aisle-side post outer end, transversely adjacent the aisle-side post passage.

In addition to one or more of the above aspects or as an alternate, a first motion damper is connected to the longitudinal post near the longitudinal post outer end, the first motion damper extends in the aft direction, beyond the aft-side of the longitudinal post.

BRIEF DESCRIPTION OF THE FIGURES

The present disclosure is illustrated by way of example and not limited in the accompanying figures in which like reference numerals indicate similar elements.

FIG. 8 shows another embodiment for the retrofit seatbelt system in which the aisle-side and window-side posts extend from the base plate, wherein the system is shown from a front viewpoint (with the sidewall on the left); and FIG. 9 shows the embodiment of FIG. 8, from in a rear (looking forward) viewpoint (with the sidewall on the right).

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
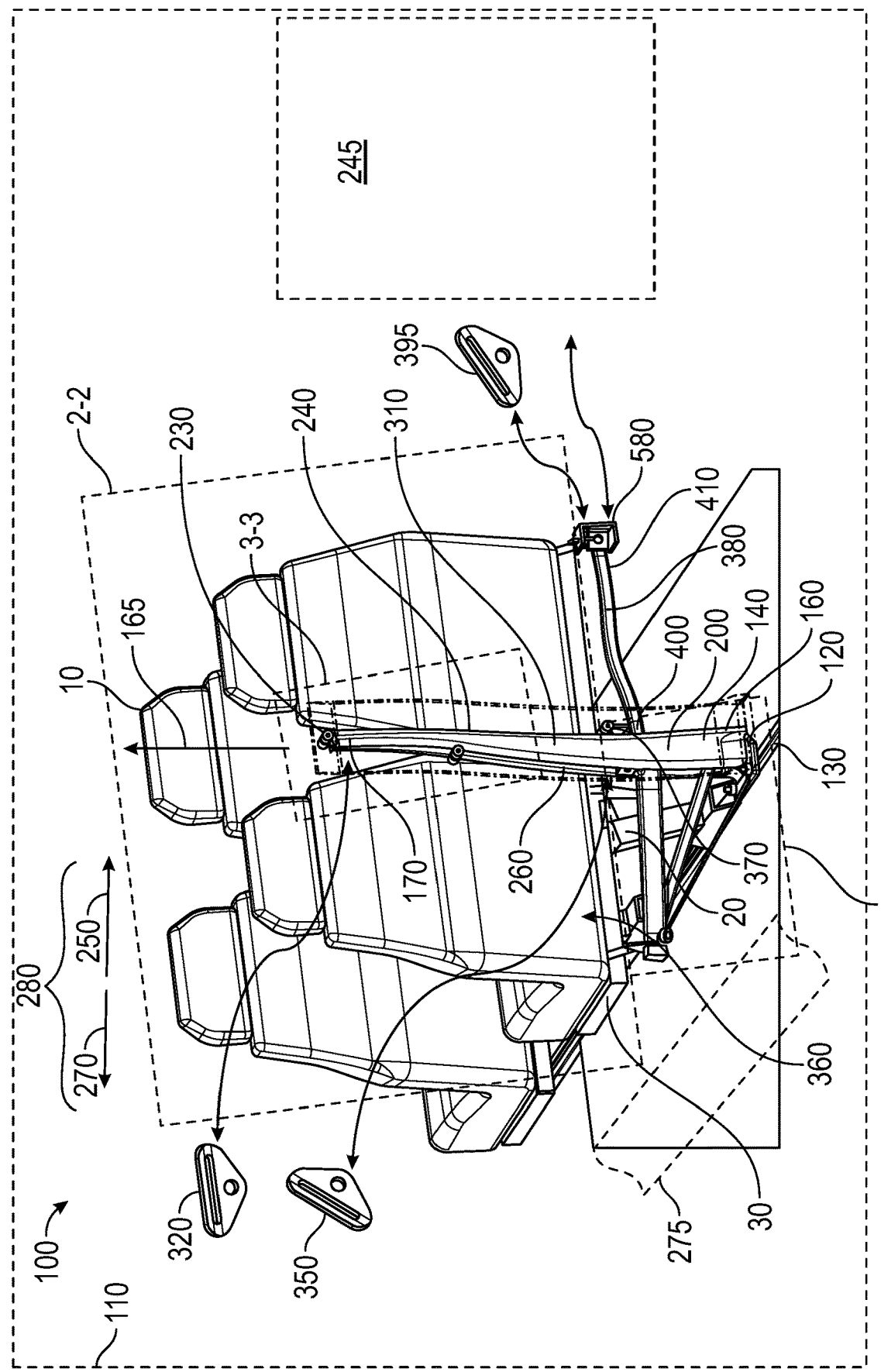
FIG. 1 shows a perspective view of seats in a motor coach with a retrofit seatbelt system affixed to the floor of the motor coach according to an embodiment.
Figure 2A:
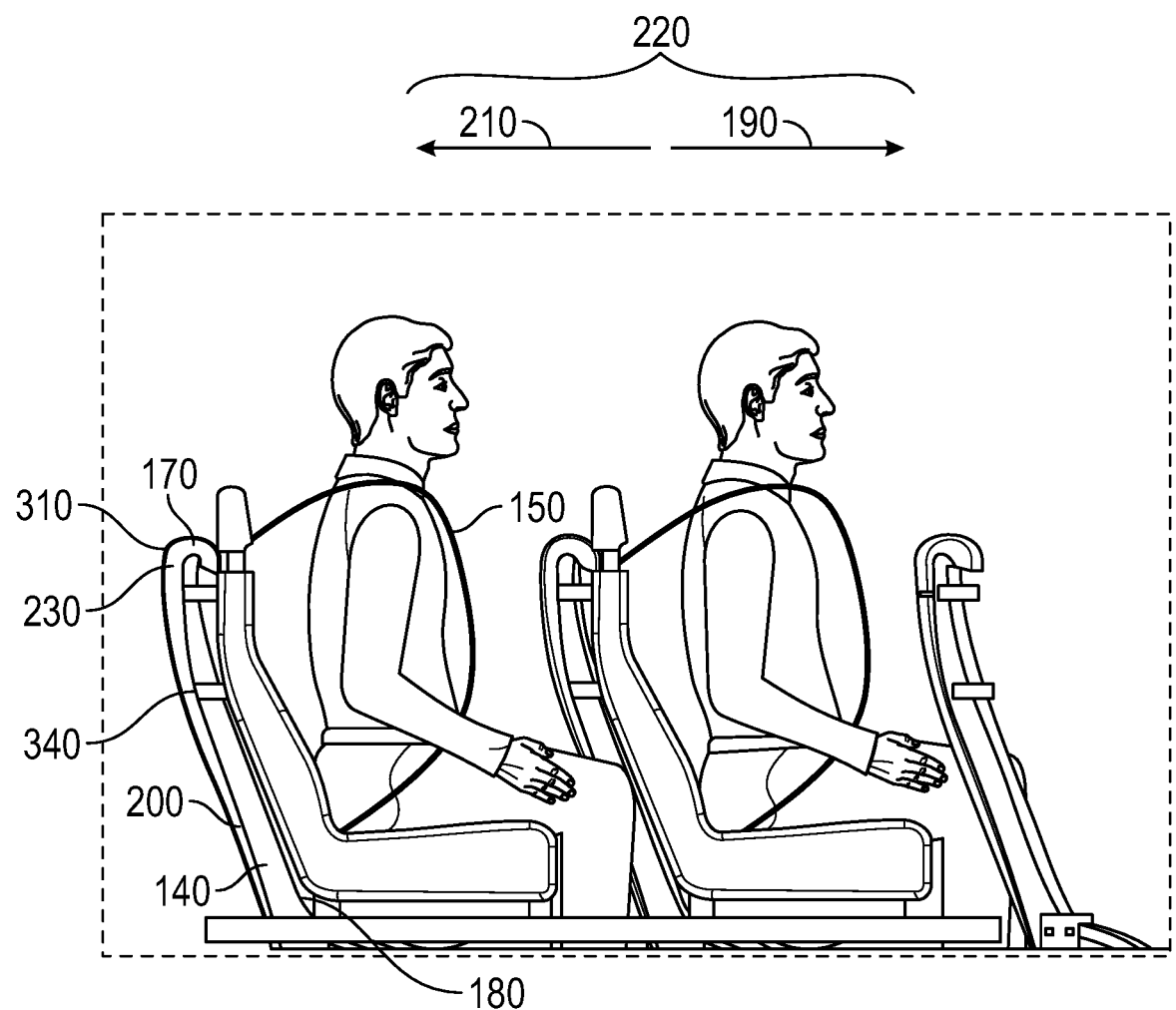
FIG. 2A shows section 2-2 of FIG. 1, which is a side view of the seats in the motor coach with the retrofit seatbelt system affixed to the floor, and with passengers in the seats.
Figure 2B:
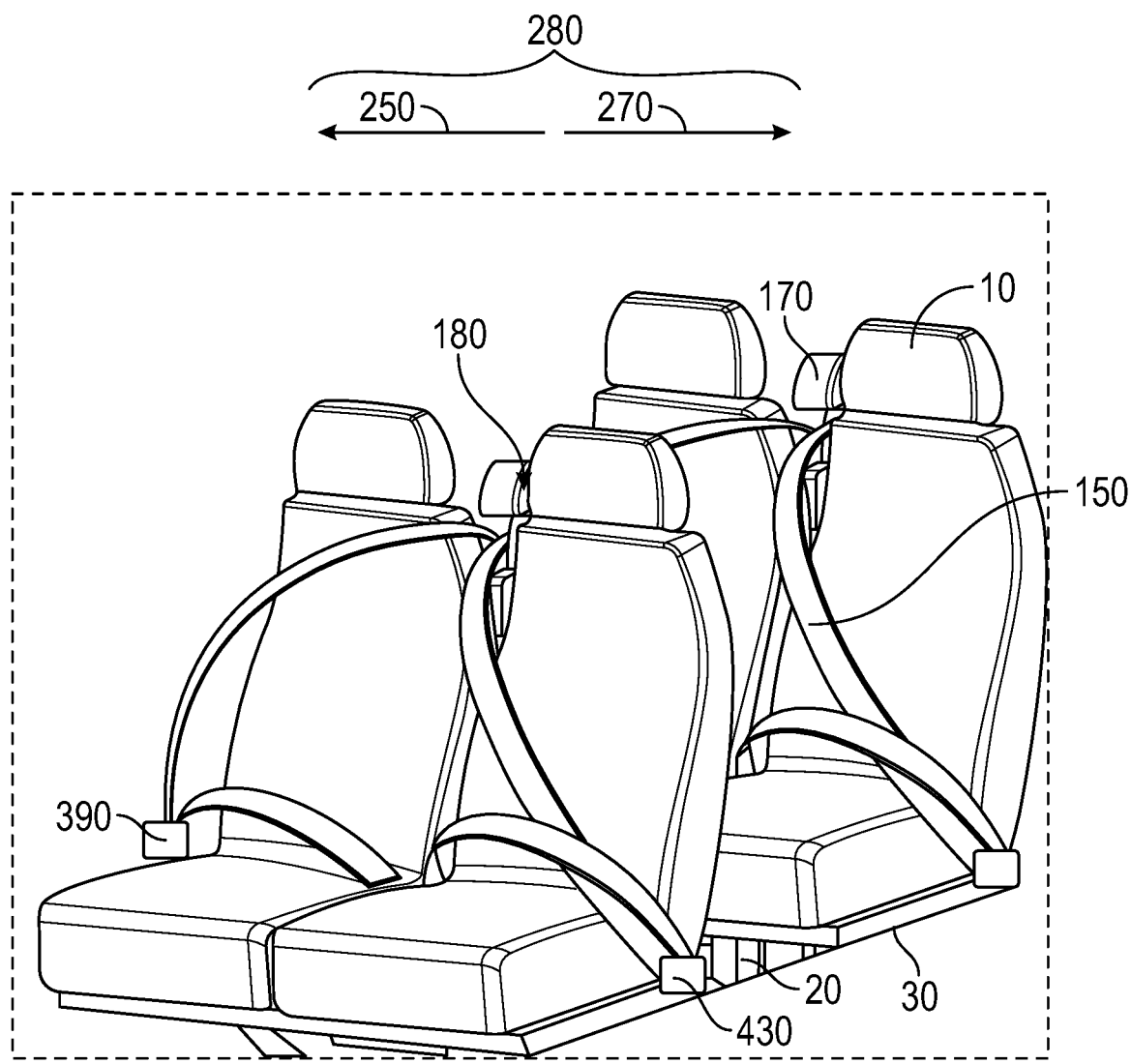
FIG. 2B shows section 2-2 of FIG. 1, which is a front perspective view of the seats in the motor coach with the retrofit seatbelt system affixed to the floor.
Figure 3:
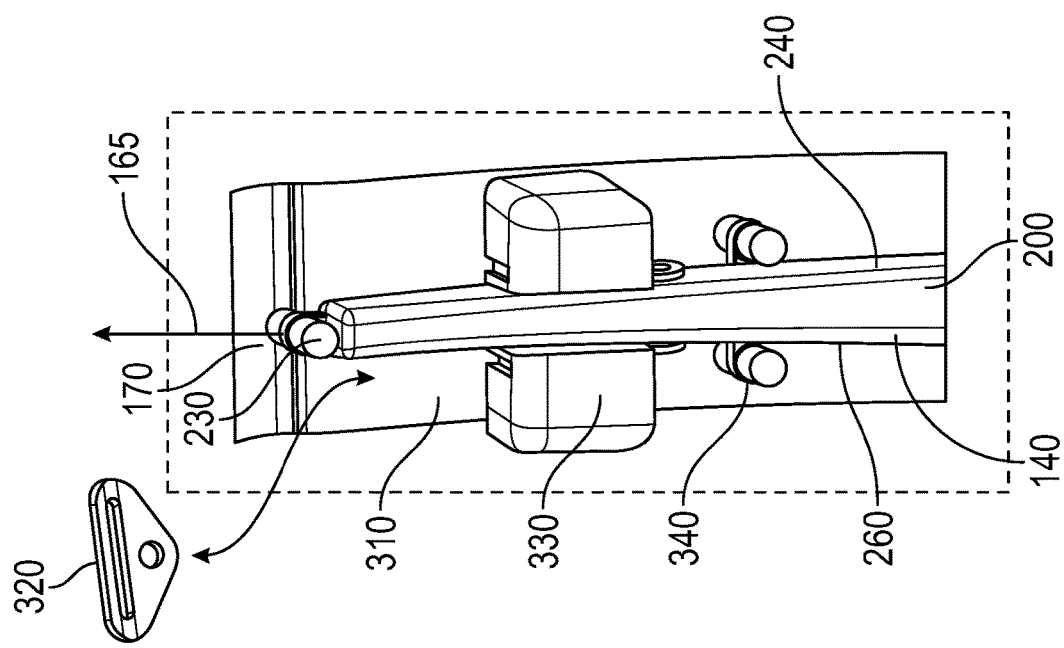
FIG. 3 shows section 3-3 of FIG. 1, according to an embodiment, showing belt retractors on a longitudinal post of the retrofit seatbelt system.

Turning to FIGS. 1-3, disclosed is a retrofitting seatbelt system (system) 100 for a motor coach 110. The system 100 includes a base plate 120. The base plate 120 is configured to connect to a floor rail 130 of the motor coach 110 (illustrated schematically). A longitudinal post 140 is configured to support a belt 150. The longitudinal post 140 defines a longitudinal post inner end 160 connected to the base plate 120. The longitudinal post 140 extends away from the base plate 120 in a longitudinal direction 165 to a longitudinal post outer end 170 (which is located at or near a headrest of a motor coach seat). The longitudinal post 140 defines a forward-side 180 that faces a forward direction 190, and an aft-side 200 that faces an aft direction 210. The forward direction 190 and aft direction 210 are disposed along a forward-aft axis 220.

A first motion damper 230 is connected to the longitudinal post 140, near the longitudinal post outer end 170. The first motion damper 230 extends in the aft direction 210, beyond the aft-side 200 of the longitudinal post 140. The first motion damper 230 (and each motion damper herein) may be a pneumatic shock absorber.

The longitudinal post 140 defines a window-side 240 that extends in a window-facing direction 250 (towards a sidewall 245 of the motor coach 110), and an aisle-side 260 that extends in an aisle-facing direction 270 (towards an aisle 275 of the motor coach 110). The window-facing direction 250 and aisle-facing direction 270 are defined on a transverse axis 280 that is normal to the forward-aft axis 220.

In one embodiment, the first motion damper 230 may be formed by a first pair of motion dampers 290, 290A (FIG. 4; which is otherwise the same as the embodiment of FIGS. 1-2 and 4), one of which 290 is disposed on the window-side 240 of the of the longitudinal post 140 and another of which 290A is disposed on the aisle-side 260 of the longitudinal post 140. A first pair of brackets 300, 300A are respectively connected to the window-side 240 and the aisle-side 260 of the longitudinal post 140. The first pair of brackets 300, 300A connect respective ones of the first pair of motion dampers 290, 290A to the longitudinal post 140. A padding cover 310 is disposed over the longitudinal post 140, from the base plate 120 to the longitudinal post outer end 170, to conceal the first motion damper 230. A top of the padding may form an inverted J shape so as to cover a portion of the forward side of the longitudinal post, providing additional safety padding to the passenger.

A longitudinal post outer belt anchor 320 (though one is illustrated, there is one for each passenger) is connected to the longitudinal post 140, near the longitudinal post outer end 170. A belt retractor 330 (FIG. 3; though one is labeled, there is one for each passenger) is connected to the longitudinal post 140, longitudinally adjacent to the longitudinal post outer end 170. The second motion damper 340 is disposed longitudinally adjacent to the belt retractor 330.

Figure 4:
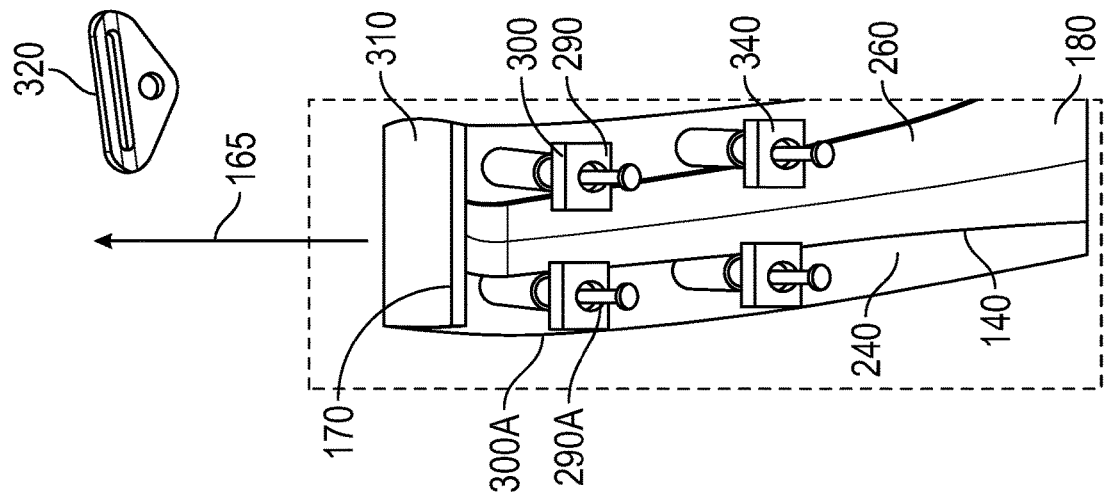
FIG. 4 shows section 3-3 of FIG. 1, according to an embodiment, showing pairs of motion dampers on both sides of the a longitudinal post.

A second motion damper 340 is connected to the longitudinal post 140, longitudinally adjacent to the belt retractor 330, between the belt retractor 330 and the base plate 120. The second motion damper 340 extends in the aft direction 210, beyond the aft-side 200 of the longitudinal post 140. As shown in FIGS. 3 and 4, the second motion damper 340 maybe a second pair of motion dampers spaced apart and connected to the longitudinal post similarly to the first pair of motion dampers.

A longitudinal post inner belt anchor 350 (though one is illustrated, there is one for each passenger) is connected to the longitudinal post 140 in a longitudinal bottom portion 360 of the longitudinal post 140, longitudinally offset from the base plate 120 (e.g., at the seat base height). A third motion damper 370 (FIG. 1) is connected to the longitudinal post 140, longitudinally adjacent to the longitudinal post inner belt anchor 350. The third motion damper 370 extends in the aft direction 210, beyond the aft-side 200 of the longitudinal post 140.

A window-side post 380 (FIG. 1) is configured to support a window-side buckle 390 (FIG. 2B, illustrated schematically) via a window-side post belt anchor 395 (FIG. 1). The window-side post 380 defines a window-side post inner end 400 connected to the window-side 240 of the longitudinal post 140. The window-side post 380 extends away from the longitudinal post 140 in the window-facing direction 250 to a window-side post outer end 410.

Figure 5:
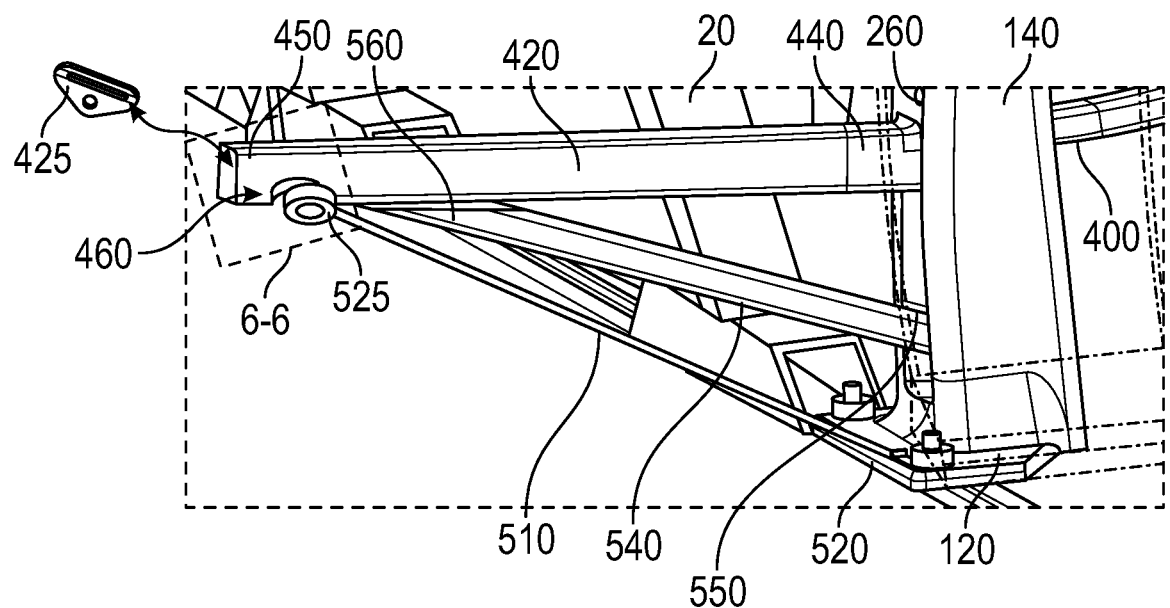
FIG. 5 shows section 5-5 of FIG. 1, according to an embodiment, showing the aisle side post, support cable and truss beam.

As shown in FIG. 5, an aisle-side post 420 is configured to support an aisle-side buckle 430 (FIG. 2B, illustrated schematically) via an aisle-side post belt anchor 425 (FIG. 1). The aisle-side post 420 defines an aisle-side post inner end 440 connected to the aisle-side 260 of the longitudinal post 140. The aisle-side post 420 extends away from the longitudinal post 140 in the aisle-facing direction 270 to an aisle-side post outer end 450.

The aisle-side post outer end 450 defines an aisle-side post passage (which is a through hole) 460. A rod 470 (FIG. 6) is disposed within the aisle-side post passage 460 and configured to slide within the aisle-side post passage 460. The rod 470 includes a rod forward end 480 and the rod 470 that extends from the rod forward end 480 to a rod aft end 490.

Figure 6:
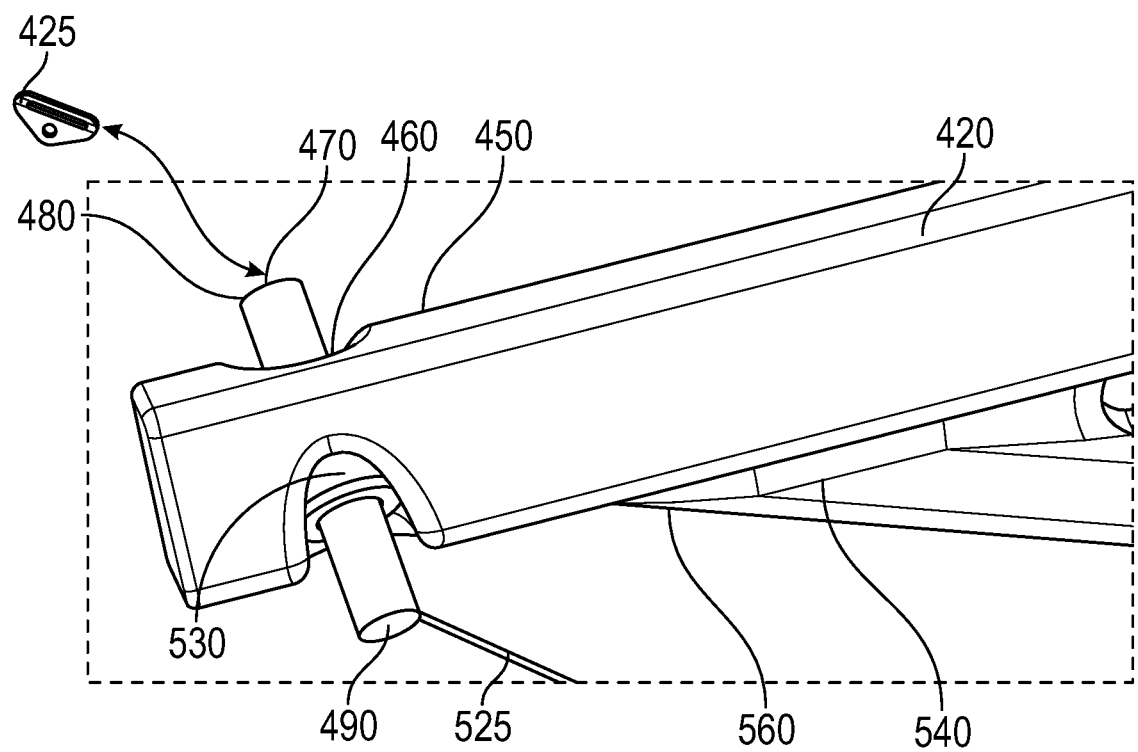
FIG. 6 shows section 6-6 of FIG. 5, according to an embodiment, showing a rod extending through a bushing of an aisle-side post.

The aisle-side post belt anchor 425 is connected to the rod forward end 480, e.g., by threads. A support cable (wire rope) 510 includes a support cable inner end 520 connected to the base plate 120. The support cable 510 extends from the support cable inner end 520 to a support cable outer end 525. The support cable outer end 525 is connected to the rod aft end 490 (FIG. 6). In operation, the aisle-side post belt anchor 500 and the support cable 510 limit forward and aft sliding of the rod 470 within the aisle-side post passage 460.

A bushing 530 (FIG. 6) is disposed within the aisle-side post passage 460 and the rod 470 is disposed within the bushing 530.

The system 100 includes a truss beam 540, in an angled orientation relative to the aisle-side post 420. The truss beam 540 defines a truss beam inner end 550 connected to the longitudinal post 140, longitudinally between the base plate 120 and the aisle-side post inner end 440. The truss beam 540 extends from the truss beam inner end 550 to a truss beam outer end 560. The truss beam outer end 560 is connected to the aisle-side post outer end 450, transversely adjacent the aisle-side post passage 460.

The aisle-side post inner end 440 and the window-side post inner end 400 are longitudinally level with each other and spaced apart from the base plate 120 so as to be longitudinally level with the aisle-side post passage 460.

The window-side post outer end 410 includes a sidewall bracket 580 (FIG. 1). The sidewall bracket 580 is configured to mount to the sidewall 245 of the motor coach 110. The window-side post belt anchor 395 may be connected to the sidewall bracket 580. The aisle-side post passage 460 and the sidewall bracket 580 may be longitudinally level with each other. The aisle-side post passage 460 is longitudinally adjacent to the longitudinal post inner belt anchor 350 via the rod.

The longitudinal post 140, the aisle-side post 420 and the window-side post 380 may be cast as a unitary structure, or the aisle-side post 420 and the window-side post 380 may be respectively affixed (e.g. welded or bolted) to the aisle-side 260 and the window-side 240 of the longitudinal post 140. The longitudinal post 140 may be shaped like a curved I-beam, with flanges positioned forward and aft and a web extending forward to aft. The longitudinal post 140 may include weight-saving holes or grooves. One or both of the side posts may be curved.

It is to be appreciated that the above configuration, with shoulder and lap level belt anchors for each seat provides a three point belting harness for each seat (as shown FIG. 2B). The spacing between the side posts and the base plate (floor of the motor coach) provides sufficient leg room for the passengers.

As shown in the FIGS. (most clearly in FIGS. 1 and 2B), the motor coach has pairs of seats 10 on each side of the aisle. The seats may be supported by a seat support extending from the floor rail 130 to the base 30 of the seats 10. The longitudinal post 140 is between the pairs of seats 10, and the outer ends of the window and aisle side posts are on respective outer sides of the seats 10 (e.g., at the window sidewall and the aisle). The base plate 120 may be adjacent, and aft, of the seat support 20 on the floor rail 130.

The above disclosed pneumatic dampers add safety of the rear unbelted passengers, better than that of a back of a seat. The damper is mounted onto the post structure. The damper size and number can be varied as per level of safety required. The area of the rear cushioned pad onto which these pneumatic dampers attach can increase to cover both seat backs to provide improved protection for the rear passengers. Compartmentalization is improved for rear passengers without the need for new seats due to the cushioned padding not built into seats but utilized as a different structure. The disclosed embodiments have an improved magnitude of damping protection that is otherwise not available.

The embodiments, which include the truss and the cable configuration, may significantly reduce an overall weight of the casted Aluminum structure compared with a configuration in which the aisle-side post is thick enough on its own to handle the loads, and thus reduces the cost of the main casted part proportionately. This solution is accomplished by orientation of a bushing shown in the structure that allows a degree of freedom to reduce magnitude of the pulling force exerted by the lap belt at that aisle side buckle anchor during a crash. Motion is prevented in that degree of freedom by the cable (a wire rope), which can be anchored to the floor because wire rope will stretch significantly less than the belt (belt webbing), reducing a likelihood of passengers lifting off of the seat or submarining under the lap belt once the seatbelt is fastened and tightened by the belt retractor.

Figure 7:
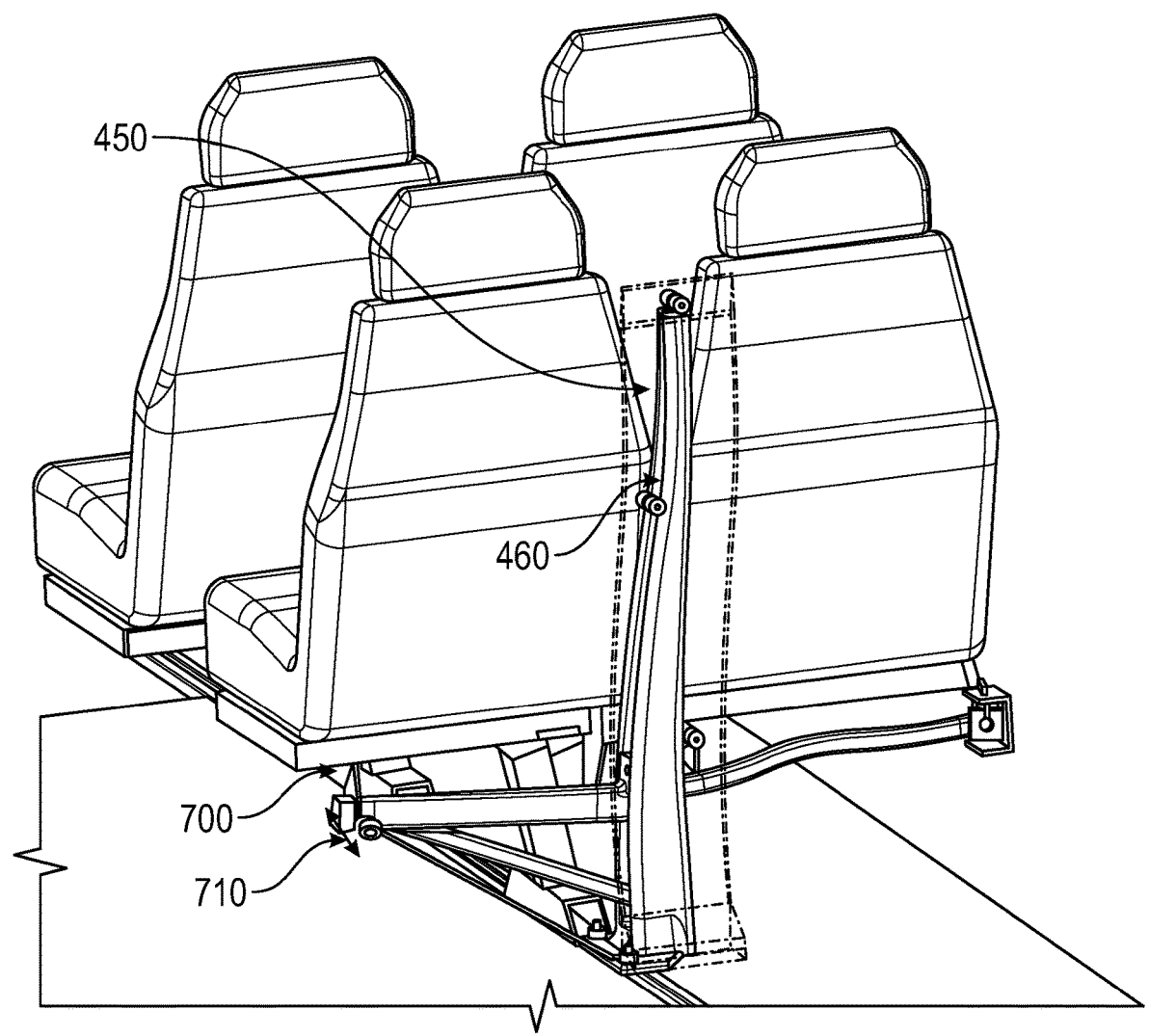
FIG. 7 shows a force diagram on the retrofit seatbelt system.

Referring to FIG. 7, the first arrows 700 indicate the application of force on impact, the second arrow 710 indicates sliding motion using bushing thus leading to transmission of tensile forces to cable, effectively reducing bending loads on the post and beam structures. Without the cable, the post/beam configuration will be loaded in bending and thus require a larger cross section, but the cable with bushing allows for forces to be loaded in compression on the posts while the cable is in tension. Effectively, the bushing allows for sliding of the cable as it would in the case of, for example, a pulley attached to the post.

Turning to FIGS. 8 and 9, an embodiment is shown for the system 100 in which the window-side and aisle-side posts 380, 420 differ identified hereinafter, and otherwise the system 100 is as provided above. For example, this embodiment includes the dampers, including but not limited to the first motion damper 230 and the longitudinal post padding cover 310 (FIG. 8).

The window-side and aisle-side posts 380, 420 extend outwardly from respective ones of the window-side 240 and aisle-side 260 of the longitudinal post 140 at the base plate 120. The outer ends of both window-side and aisle-side posts 380, 420 are at the longitudinal position identified above (to be level with the base of the seats). Both have an arcuate (curvilinear) profile for the purpose of providing extra legroom to passengers sitting immediately aft thereof. Thus, the curves that define both window-side and aisle-side posts 380, 420 (which may differ from each other) inflect at a location that is forwardly spaced apart from the forward side 180 (FIG. 8) of the longitudinal post 140 (and forward of the base plate 120).

The aisle-side post 420 is without the additional support of the truss beam 540 and the support cable 510 in this embodiment so that the aisle-side post 420 is thicker (and heavier) along its length than in the above embodiments. The aisle-side post 420 is effectively cantilevered as it has no additional supports exterior to the base plate 120. In comparison the sidewall bracket 580 mounts the window-side post 380 to the motor coach sidewall 245 (FIG. 1) providing support that enables the utilization of a smaller sized (in cross section) window-side post 380.

The applicability of the disclosed embodiments is similar to the applicability for the embodiments identified in U.S. patent Ser. No. 10/369,961, titled "Retrofit seat belt system", granted to Applicant, the entire disclosure of which is incorporated herein by reference.

As used herein (expressly or implicitly) a "motor coach," according to the National Highway Traffic Safety Administration (NHTSA) of the United States Department of Transportation, is a bus with a gross vehicle weight rating (GVWR) greater than 11,793 kg (26,000 pounds (lb.)) are defined as motor coaches. A bus is any of several types of self-propelled vehicles, generally rubber-tired, intended for use on city streets, highways, and busways, including but not limited to minibuses, forty- and thirty-foot buses, articulated buses, double-deck buses, motor coaches, and electrically powered trolley buses, used by public entities to provide designated public transportation service and by private entities to provide transportation service. It is noted that while example systems and methods presented herein may be specifically directed towards retrofitting a motor coach or other Bus type seat with seatbelts, the present disclosure is not limited to such embodiments. Indeed, the systems and methods herein may be used to retrofit any number of similar types of seats regardless of mode of transportation. For example, in some embodiments, the systems and methods presented herein may be adapted for retrofitting similar type seats on a boat, subway, train, or other mode of transportation.

As used herein a "seat belt assembly" means any strap, webbing, or similar device designed to secure a person in a motor vehicle in order to mitigate the results of any accident, including all necessary buckles and other fasteners, and all hardware designed for installing such seat belt assembly in a motor vehicle.

As used herein, an "anchor" is any component, other than the webbing or straps, involved in transferring seat belt loads to the vehicle structure. A "buckle" is a quick release connector which fastens a person in a seat belt assembly. A "retractor" is a device for storing part or all of the webbing in a seat belt assembly. A "baseplate" is a floor mounted device that has been designed as an anchor point for the seat belt webbing.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

We claim:

1. A retrofitting seatbelt system for a motor coach, the system comprising:
   a base plate,
   the base plate configured to connect to a floor rail of the motor coach;
   a longitudinal post configured to support a belt, the longitudinal post defines a longitudinal post inner end connected to the base plate, wherein the longitudinal post extends away from the base plate in a longitudinal direction to a longitudinal post outer end,
   wherein the longitudinal post defines a forward-side that faces a forward direction, and an aft-side that faces an aft direction, wherein the forward direction and the aft direction are disposed along a forward-aft axis; and
   a first motion damper connected to the longitudinal post near the longitudinal post outer end, the first motion damper extends in the aft direction, beyond the aft-side of the longitudinal post.

2. The system of claim 1, wherein
   the longitudinal post defines a window-side that extends in a window-facing direction, and an aisle-side that extends in an aisle-facing direction, wherein the window-facing direction and aisle facing-direction are defined on a transverse axis that is normal to the forward-aft axis, and
   the first motion damper is formed by a first pair of motion dampers, one of which is disposed on the window-side of the of the longitudinal post and another of which is disposed on the aisle-side of the longitudinal post.

3. The system of claim 2, wherein
   a first pair of brackets are respectively connected to the window-side and the aisle-side of the longitudinal post, and
   the first pair of brackets connect respective ones of the first pair of motion dampers to the longitudinal post.

4. The system of claim 1, wherein
   a padding cover is disposed over the longitudinal post, from the base plate to the longitudinal post outer end, to conceal the first motion damper.

5. The system of claim 1, wherein
   the first motion damper is pneumatic.

6. The system of claim 1, wherein
   a longitudinal post outer belt anchor is connected to the longitudinal post, near the longitudinal post outer end,
   a belt retractor is connected to the longitudinal post, longitudinally adjacent to the longitudinal post outer end, and
   the first motion damper is disposed longitudinally adjacent to the longitudinal post outer belt anchor and/or the belt retractor.

7. The system of claim 6, wherein
   a second motion damper is connected to the longitudinal post, longitudinally adjacent to the belt retractor, wherein the second motion damper extends in the aft direction, beyond the aft-side of the longitudinal post.

8. The system of claim 7, wherein
   a longitudinal post inner belt anchor is connected to the longitudinal post in a longitudinal bottom portion of the longitudinal post, longitudinally offset from the base plate, and
   a third motion damper is connected to the longitudinal post, longitudinally adjacent to the longitudinal post inner belt anchor, the third motion damper extends in the aft direction, beyond the aft-side of the longitudinal post.

9. The system of claim 1, wherein
   the longitudinal post defines a window-side that extends in a window-facing direction, and an aisle-side that extends in an aisle-facing direction, wherein the window-facing direction and aisle facing-direction are defined on a transverse axis that is normal to the forward-aft axis,
   a window-side post is configured to support a window-side buckle, wherein the window-side post defines a window-side post inner end connected to the window-side of the longitudinal post, wherein the window-side post extends away from the longitudinal post in the window-facing direction to a window-side post outer end, and
   an aisle-side post is configured to support an aisle-side buckle, wherein the aisle-side post defines an aisle-side post inner end connected to the aisle-side of the longitudinal post, and wherein the aisle-side post extends away from the longitudinal post in the aisle-facing direction to an aisle-side post outer end.

10. The system of claim 9, wherein
    the aisle-side post outer end defines an aisle-side post passage, and
    the system further includes:
    a rod that is disposed within the aisle-side post passage and configured to slide within the aisle-side post passage, wherein the rod includes a rod forward end and the rod extends from the rod forward end to a rod aft end;
    an aisle-side post belt anchor, wherein the aisle-side post belt anchor is connected to the rod forward end; and
    a support cable, wherein the support cable includes a support cable inner end connected to the base plate, the support cable extends from the support cable inner end to a support cable outer end, wherein the support cable outer end is connected to the rod aft end, wherein, in operation, the aisle-side post belt anchor and the support cable are configured to limit forward and aft sliding of the rod within the aisle-side post passage.

11. The system of claim 10, wherein
a bushing is disposed within the aisle-side post passage and the rod is disposed within the bushing.

12. The system of claim 11, wherein
the system includes
a truss beam,
wherein the truss beam is in an angled orientation relative to the aisle-side post, and
wherein the truss beam defines a truss beam inner end connected to the longitudinal post, longitudinally between the base plate and the aisle-side post inner end, wherein the truss beam extends from the truss beam inner end to a truss beam outer end, the truss beam outer end connected to the aisle-side post outer end, transversely adjacent the aisle-side post passage.

13. The system of claim 12, wherein
the aisle-side post inner end and the window-side post inner end are longitudinally level with each other and spaced apart from the base plate so as to be longitudinally level with the aisle-side post passage.

14. The system of claim 13, wherein
the aisle-side post outer end includes:
a window-side post belt anchor; and
a sidewall bracket, wherein the sidewall bracket is configured to mount to a sidewall of the motor coach.

15. The system of claim 14, wherein
the aisle-side post passage and the sidewall bracket are longitudinally level with each other.

16. The system of claim 15, wherein
a longitudinal post inner belt anchor is connected to the longitudinal post in a longitudinal bottom portion of the longitudinal post, longitudinally offset from the base plate, and
the aisle-side post passage is longitudinally adjacent to the longitudinal post inner belt anchor via the rod.

17. A retrofitting seatbelt system for a motor coach, the system comprising:
a base plate,
wherein the base plate is configured to connect to a floor rail of the motor coach;
a longitudinal post configured to support a belt, the longitudinal post defines a longitudinal post inner end connected to the base plate, wherein the longitudinal post extends away from the base plate in a longitudinal direction to a longitudinal post outer end,
wherein the longitudinal post defines a forward-side that faces a forward direction, and an aft-side that faces an aft direction, wherein the forward direction and the aft direction are disposed along a forward-aft axis, and the longitudinal post defines a window-side that extends in a window-facing direction, and an aisle-side that extends in an aisle-facing direction, wherein the window-facing direction and aisle facing-direction are defined on a transverse axis that is normal to the forward-aft axis;
a window-side post configured to support a window-side buckle, wherein the window-side post defines a window-side post inner end connected to the window-side of the longitudinal post, wherein the window-side post extends away from the longitudinal post in the window-facing direction to a window-side post outer end, and
an aisle-side post configured to support an aisle-side buckle, wherein the aisle-side post defines an aisle-side post inner end connected to the aisle-side of the longitudinal post, and wherein the aisle-side post extends away from the longitudinal post in the aisle-facing direction to an aisle-side post outer end, and wherein
the aisle-side post outer end defines an aisle-side post passage,
the system further includes:
a rod that is disposed within the aisle-side post passage and configured to slide within the aisle-side post passage, wherein the rod includes a rod forward end and a rod aft end;
an aisle-side post belt anchor, wherein the aisle-side post belt anchor is connected to the rod forward end; and
a support cable, wherein the support cable includes a support cable inner end connected to the base plate, the support cable extends from the support cable inner end to a support cable outer end, wherein the support cable outer end is connected to the rod aft end, wherein, in operation, the aisle-side post belt anchor and the support cable are configured to limit forward and aft sliding of the rod within the aisle-side post passage.

18. The system of claim 17, wherein
the system includes
a truss beam,
wherein the truss beam is in an angled orientation relative to the aisle-side post, and
wherein the truss beam defines a truss beam inner end connected to the longitudinal post, longitudinally between the base plate and the aisle-side post inner end, wherein the truss beam extends from the truss beam inner end to a truss beam outer end, the truss beam outer end connected to the aisle-side post outer end, transversely adjacent the aisle-side post passage.

19. The system of claim 18, wherein
a first motion damper is connected to the longitudinal post near the longitudinal post outer end, the first motion damper extends in the aft direction, beyond the aft-side of the longitudinal post.

* * * * *